(12) United States Patent
Gao et al.

(10) Patent No.: US 12,072,194 B2
(45) Date of Patent: Aug. 27, 2024

(54) METHOD OF NAVIGATING AUTONOMOUS VEHICLE TO PASSENGER PICKUP / DROP-OFF LOCATION

(71) Applicant: Argo AI, LLC, Pittsburgh, PA (US)

(72) Inventors: Shenglong Gao, Sunnyvale, CA (US); Ramadev Burigsay Hukkeri, Pittsburgh, PA (US); Israel-Marc Kositsky, Cranberry Township, PA (US); Dale Lord, Gibsonia, PA (US)

(73) Assignee: Argo AI, LLC, Pittsburgh, PA (US)

( * ) Notice: Subject to any disclaimer, the term of this patent is extended or adjusted under 35 U.S.C. 154(b) by 452 days.

(21) Appl. No.: 17/244,379

(22) Filed: Apr. 29, 2021

(65) Prior Publication Data

US 2022/0349720 A1 Nov. 3, 2022

(51) Int. Cl.
*G01C 21/34* (2006.01)
*G01C 21/36* (2006.01)
*G06Q 10/02* (2012.01)
*G06Q 50/40* (2024.01)

(52) U.S. Cl.
CPC ..... *G01C 21/3438* (2013.01); *G01C 21/3602* (2013.01); *G01C 21/3697* (2013.01); *G06Q 10/02* (2013.01); *G06Q 50/40* (2024.01)

(58) Field of Classification Search
CPC ............ G01C 21/3438; G01C 21/3602; G01C 21/3697; G06Q 10/02; G06Q 50/30
See application file for complete search history.

(56) References Cited

U.S. PATENT DOCUMENTS

| | | |
|---|---|---|
| 9,733,096 B2 | 8/2017 | Colijn et al. |
| 10,261,512 B1 | 4/2019 | Cullinane et al. |
| 10,401,858 B2 | 9/2019 | Pandit et al. |
| 10,769,452 B2 | 9/2020 | Rasmusson, Jr. et al. |
| 2009/0069994 A1 | 3/2009 | Uechi et al. |
| 2017/0138751 A1 | 5/2017 | Martyniv et al. |
| 2018/0107222 A1 | 4/2018 | Fairfield et al. |
| 2018/0113456 A1 | 4/2018 | Iagnemma et al. |

(Continued)

FOREIGN PATENT DOCUMENTS

WO WO-2020193392 A1 * 10/2020 ......... G01C 21/3438

OTHER PUBLICATIONS

Machine Translation WO 20200193392 (year:2020).*

(Continued)

*Primary Examiner* — Anne Marie Antonucci
*Assistant Examiner* — Lidia Kwiatkowska
(74) *Attorney, Agent, or Firm* — Fox Rothschild LLP

(57) ABSTRACT

A ride service system will determine a stopping location for an autonomous vehicle (AV) before the AV picks up a passenger in response to a ride service request. The system will determine a pickup area for the request, along with a loading point within a pickup area, and the AV will navigate along the route toward the pickup area. Before the AV reaches the pickup area, the system will determine whether it received a departure confirmation indicating that the passenger is at the loading point. If the system received the departure confirmation, the AV will navigate into the pickup area and stop at the loading point; otherwise, the AV will either (a) navigate to an intermediate stopping location before reaching the pickup area or (b) pass through the pickup area.

22 Claims, 8 Drawing Sheets

(56) References Cited

U.S. PATENT DOCUMENTS

| | | | |
|---|---|---|---|
| 2018/0136656 A1* | 5/2018 | Rasmusson, Jr. | B62D 15/0285 |
| 2018/0143641 A1 | 5/2018 | Rao | |
| 2018/0315146 A1* | 11/2018 | Matthiesen | G01C 21/3461 |
| 2018/0328748 A1 | 11/2018 | Chachra et al. | |
| 2018/0329418 A1 | 11/2018 | Baalke et al. | |
| 2019/0066515 A1 | 2/2019 | Dyer et al. | |
| 2019/0187702 A1 | 6/2019 | Herbach et al. | |
| 2019/0193733 A1 | 6/2019 | Russell et al. | |
| 2019/0228375 A1 | 7/2019 | Laury et al. | |
| 2019/0369621 A1 | 12/2019 | Pandit et al. | |
| 2020/0104770 A1 | 4/2020 | Aich et al. | |
| 2020/0117926 A1 | 4/2020 | Kim | |
| 2020/0148196 A1 | 5/2020 | Lim | |
| 2020/0158523 A1 | 5/2020 | Kline et al. | |
| 2020/0160709 A1* | 5/2020 | Ramot | G06Q 10/047 |
| 2020/0166935 A1 | 5/2020 | Herbach et al. | |
| 2020/0192382 A1 | 6/2020 | Pandit et al. | |
| 2020/0192385 A1 | 6/2020 | Fairfield et al. | |
| 2020/0240798 A1 | 7/2020 | Gao et al. | |
| 2020/0240799 A1 | 7/2020 | Gao et al. | |
| 2020/0310461 A1* | 10/2020 | Kaufman | B60W 60/00253 |
| 2020/0346662 A1 | 11/2020 | Suzuki et al. | |
| 2020/0363805 A1 | 11/2020 | Arden et al. | |
| 2020/0410406 A1* | 12/2020 | Leary | B60Q 9/00 |
| 2021/0053567 A1* | 2/2021 | Dyer | B60W 30/18009 |
| 2021/0089788 A1 | 3/2021 | Engle et al. | |
| 2021/0096565 A1 | 4/2021 | Xie et al. | |
| 2021/0107476 A1 | 4/2021 | Cui | |
| 2021/0114617 A1 | 4/2021 | Phillips et al. | |
| 2021/0133466 A1 | 5/2021 | Gier et al. | |
| 2022/0073070 A1 | 3/2022 | Niewiadomski et al. | |
| 2022/0073099 A1 | 3/2022 | Park et al. | |
| 2022/0136847 A1 | 5/2022 | Higuchi et al. | |
| 2022/0221867 A1 | 7/2022 | Taveira et al. | |
| 2022/0326031 A1 | 10/2022 | Ohnogi et al. | |

OTHER PUBLICATIONS

Information about Related Patents and Patent Applications, see section 4 of the accompanying Information Disclosure Statement Letter, which concerns Related Patents and Patent Applications.

International Search Report and Written Opinion issued Jul. 31, 2022 in application No. PCT/US2022/071954 (11 pages).

International Search Report and Written Opinion issued Aug. 4, 2022 in application No. PCT/US2022/071952 (10 pages).

International Search Report and Written Opinion issued Dec. 7, 2022 in application No. PCT/US2022/44264 (11 pages).

Y. Li, N. Li, H. E. Tseng, I. Kolmanovsky, A. Girard and D. Filev, "A Game Theoretic Approach for Parking Spot Search with Limited Parking Lot Information," 2020 IEEE 23rd International Conference on Intelligent Transportation Systems (ITSC), Rhodes, Greece, 2020, pp. 1-6, (Year: 2020).

* cited by examiner

METHOD OF NAVIGATING AUTONOMOUS VEHICLE TO PASSENGER PICKUP / DROP-OFF LOCATION

BACKGROUND

When a taxi, ride-sharing service, shuttle or other vehicle needs to stop and pick up or drop off a passenger at a location along a road, the passenger and the vehicle operator must come to consensus on when and where the pickup or drop-off will occur. However, sometimes a passenger who requested the vehicle does not reach the pickup location at the expected time. In other situations, traffic conditions, obstacles and/or other vehicles may prevent the service vehicle from reaching the appointed location at the scheduled time.

When this happens, if the vehicle is operated by a human the driver will use his or her judgment as to whether to stop at an alternate location, pass the scheduled location and return to it later, or take some other action. In such situations, human operators sometimes even cause the vehicle to make an illegal maneuver, such as double-parking, if the human operator considers it safe to do so. However, if the vehicle is an autonomous vehicle that is not being directed by a human, the vehicle's motion planning system must decide what to do—typically in less time than human operators will have, and without violating traffic laws or customs. This is a computationally challenging problem, especially in urban environments where available space to stop may be limited and numerous other actors must be considered before the vehicle implements any maneuver.

This document describes methods and systems that are directed to addressing the problems described above, and/or other issues.

SUMMARY

This document describes a ride service system that incorporates an autonomous vehicle (AV) comprising a perception system, a motion planning system and a motion control system. One or more processors onboard the vehicle and optionally one or more additional processors of the system will determine a stopping location for the AV before picking up a passenger. The system will do this by receiving a ride service request that has been transmitted from a ride service application on a passenger electronic device. Upon receipt of the ride service request, the system will determine a pickup area for the ride service request, along with a loading point that is within a pickup area. The system will then determine a route from a starting location of the AV to the pickup area, and it will cause the AV to navigate along the route toward the pickup area. Before the AV reaches the pickup area, the system will determine whether it has received a departure confirmation from the passenger electronic device. The departure confirmation, when received, will include data confirming that coordinates of the passenger electronic device correspond to the loading point. If the one or more processors have received the departure confirmation, the AV will navigate into the pickup area and stop at the loading point; otherwise, the AV will either (a) navigate to an intermediate stopping location before reaching the pickup area or (b) pass through the pickup area.

In some embodiments, to determine the loading point, the system may: determine a passenger identifier that is associated with the passenger electronic device; access a passenger profile server and query the passenger profile server for a passenger profile that corresponds to the passenger identifier; access the passenger profile to extract one or more loading point location rules from the passenger profile; and use the loading point location rules to select the loading point from a set of candidate loading points. In such embodiments, the loading point location rules may include one or more rules to prioritize one or more of the following characteristics to determine the loading point: (i) a lane segment that is in front of an entry of a building having a location that corresponds to a location of the passenger electronic device; (ii) a lane segment that is midway between two cross streets; or (iii) a lane segment that is as close as possible to the cross street that is next in the direction of traffic while remaining a threshold distance away from that cross street.

In some embodiments, the system may determine the intermediate stopping location as a location that both (a) is along the route between a current location of the AV and the loading point and (b) satisfies each of multiple permissible stopping location criteria.

In some embodiments, after the system receives the departure confirmation and before the AV reaches the loading point, the AV's perception system may capture perception data about the environment through which the AV travels to look for other vehicles that are near the AV. The system may process the perception system to determine whether the AV can stop and perform a loading operation at the loading point without obstructing another vehicle that is following the AV. The system may only stop the AV at the loading point to perform the loading operation if the loading operation will not obstruct the another vehicle; otherwise the system may navigate the AV to an intermediate stopping location and notify the passenger electronic device that the loading operation will be performed at the intermediate stopping location. To determine whether the AV can stop and perform a loading operation at the loading point without obstructing another vehicle that is following the AV, the system may determine whether the loading point is in a location that will require the AV to at least partially block a lane in the other vehicle that is following the AV is currently traveling, and the system may determine that the AV will obstruct the other vehicle if (a) the loading point is in a location that will require the AV to at least partially block the lane, and (b) the loading operation will have a duration that exceeds a time before which the other vehicle can safely and non-suddenly stop.

In some embodiments, after the system receives the departure confirmation and before the AV reaches the loading point, the system may process data received from a perception system of the AV to identify one or more objects located proximate to the loading point, measure a length of a stop zone that includes the loading point and that is free from obstruction. The system may use a current speed of the AV and the measured length of the stop zone to determine whether the AV can safely and non-suddenly stop within the stop zone. The system may only stop the AV at the loading point to perform the loading operation if the AV can safely and non-suddenly stop within the stop zone, otherwise the system may navigate the AV to an intermediate stopping location and notify the passenger electronic device that the loading operation will be performed at the intermediate stopping location.

In some embodiments, after the AV reaches the pickup area, the system may receive a nudge request. When this happens, the system may process data received by a perception system of the AV to determine whether any objects would obstruct the AV if the AV would move to a position that is ahead of the loading point by a specified distance. If no objects would obstruct the AV, the system may update the loading point to move forward by the specified distance and move the vehicle to the updated loading point.

In some embodiments, when the one or more processors have not received the departure confirmation, the system may determine the intermediate stopping location by: (i) selecting a road segment that is a nearest useable road segment to the pickup location; (ii) identifying, from one or more permissible stopping points along the road segment, the permissible stopping point that is closest to the pickup location; and (iii) using the permissible stopping point that is closest to the pickup location as the intermediate stopping location.

In other embodiments, a method of determining a stopping location for a vehicle before picking up a passenger is disclosed. To implement this method one or more processors, at least one of which is a component of an autonomous vehicle (AV), will receive a ride service request that has been transmitted from a ride service application on a passenger electronic device. The processors will determine a pickup area for the ride service request, along with a loading point that is within a pickup area. The processors will determine a route from a starting location of the AV to the pickup area. The processors will determine an intermediate stopping location as a location that (a) is along the route between a current location of the AV and the loading point, and (b) satisfies each of a plurality of permissible stopping location criteria. The AV will navigate along the route toward the pickup area. Before the AV reaches the pickup area, the processors will determine whether they have received a departure confirmation from the passenger electronic device, wherein the departure confirmation includes data confirming that coordinates of the passenger electronic device correspond to the loading point. In response to determining that the system has received the departure confirmation, the AV will navigate toward the pickup area. When the vehicle identifies one or more objects located proximate to the loading point, the system will measure a length of a stop zone that includes the loading point and that is free from obstruction. The system will then use a current speed of the AV and the measured length of the stop zone to determine whether the AV can non-suddenly stop within the stop zone in compliance with permissible stopping criteria. The system will stop at the loading point to perform the loading operation if system determines that the AV can non-suddenly stop within the stop zone in compliance with permissible stopping criteria, otherwise the AV will navigate to the intermediate stopping location and notify the passenger electronic device that the loading operation will be performed at the intermediate stopping location. Optionally, after receiving the departure confirmation and before the AV reaches the loading point, the system may also process data received from a perception system of the AV to determine whether the AV can stop and perform a loading operation at the loading point without obstructing another vehicle that is following the AV. If this happens, the AV may only stop at the loading point to perform the loading operation if the loading operation will not obstruct the another vehicle, otherwise the AV may navigate to the intermediate stopping location and notify the passenger electronic device that the loading operation will be performed at the intermediate stopping location.

DETAILED DESCRIPTION

Figure 1:
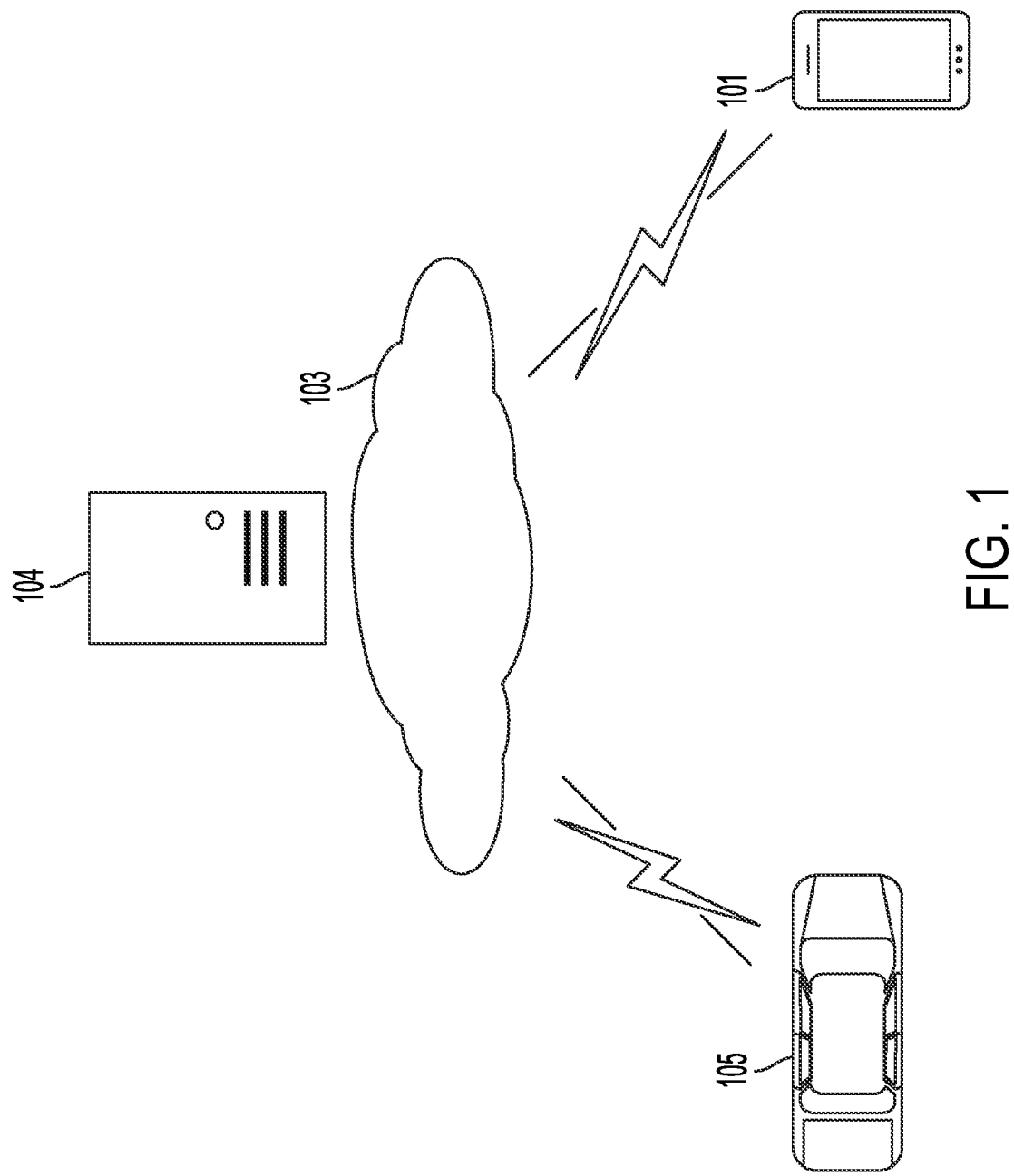
FIG. 1 illustrates a system in which a passenger uses an electronic device to initiate a ride service request for a vehicle.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to."

This document describes processes by which an autonomous vehicle (AV) may make decisions about where and when to move when making a ride service trip during which the AV will pick up, drop off, or both pick up and drop off one or more passengers (which may be people or objects such as packages). A ride service may include any or all of the following elements: (1) navigating to a pickup location, and in particular a location at which the AV can stop to allow the passenger to get into the vehicle in compliance with permissible stopping criteria; (2) picking up the passenger by stopping for sufficient time for the passenger to board, and (optionally) time to complete one or more other pickup tasks; (3) navigating to a drop-off location, and in particular a location at which the AV can stop to allow the passenger to disembark in compliance with permissible stopping criteria; and (4) dropping off the passenger by stopping for sufficient time for the passenger to exit the vehicle, and (optionally) time to complete one or more other drop-off tasks. Elements (1) and (2) may be skipped if the vehicle is starting at a fixed point of origin such as a loading terminal, parking lot, or other predetermined location that is not dynamically determined.

When navigating in an environment, AVs rely on high definition (HD) maps. An HD map is a set of digital files containing data about physical details of a geographic area such as roads, lanes within roads, traffic signals and signs, barriers, and road surface markings. An AV uses HD map data to augment the information that the AV's on-board cameras, LiDAR system and/or other sensors perceive. The AV's on-board processing systems can quickly search map data to identify features of the AV's environment and/or to help verify information that the AV's sensors perceive.

Some pickup and drop-off locations may be predefined and stored in the available HD map. Such locations may include, for example: hotel driveways; airports; other locations with taxi, rideshare and/or shuttle stops; and other venues that have defined passenger pickup and/or drop-off locations. In such locations, the AV must be able to navigate to the predefined location but make adjustments if the passenger is not present at the location, or if obstacles prevent the AV from reaching the predefined location. In other areas such as urban environments, the pickup or drop-off location may not be fixed. For non-fixed locations, in each case the AV must dynamically determine when and where it can execute pickup and drop-off operations in compliance with permissible stopping criteria. The AV must be able to make these decisions in consideration of the criteria, passenger convenience and the burden that the AV's stop may place on other vehicles that are moving near the pickup/drop-off location.

To address this, the processes described in this document will consider the concepts of "Desired Stopping Locations" (DSLs), "Intermediate Stopping Locations" (ISLs), "Final Stopping Location" (FSL), "Pickup/Drop-off Zones" (PDZs) and "Pickup/Drop-off Queues" (PDQs).

As used in this document, a Desired Stopping Location (DSL) is a location for which a passenger submits a request for a pickup or drop-off operation. In other words, it the location at which the passenger asks to board or exit the AV. This document also may use the term "loading point" as a synonym for a DSL.

An Intermediate Stopping Location (ISL) is an area that is suitable for an AV to perform a pickup or drop-off operation when the DSL cannot be served.

A Final Stopping Location (FSL) is the location actually stops to perform the pickup or drop-off operation. The FSL may be the DSL, the ISL, or another location.

A Pickup/Drop-off Zone (PDZ) is a zone around a stopping location (DSL, ISL or FSL) at which an AV is permitted to stop for a pickup or drop-off operation, in which the permission is defined by a stored set of rules. PDZs are used to as a guide to help a vehicle dynamically determine where to stop, such as in-lane or curbside.

A Pickup/Drop-off Queue (PDQ) is a sector of a mapped area within which an AV is permitted to stop for a pickup or drop-off operation, in which the permission is defined by a polygon that includes the DSL, ISL or FSL. The polygon will be denoted in HD map data that is available to the AV. In contrast to PDZs, which are dynamically determined, PDQs are predefined.

Definitions for additional terms that are relevant to this document are included at the end of this Detailed Description.

The processes described in this document start with transmission and receipt a ride service request, which is illustrated by way of example in FIG. 1, in which a transceiver of an AV 105 receives a ride service request that a passenger electronic device 101 transmitted via a wireless communication network 103. The request is shown as transmitted via a remote server 104 that receives the request, processes it, and relays it to the AV via the network 103 as will be described below. However, the ride service request could also be transmitted directly from the passenger electronic device 101 to the AV 105, such as by a Bluetooth or other near-field or short range communication, in which the request could be to initiate a new ride service request or alter an existing ride service request. In addition, a ride service request may be directly input into a user interface of the AV, such as an in-dashboard touch screen device or a microphone that is part of a vehicle speech-to-text recognition system.

The passenger electronic device 101 is an electronic device containing a browser, a dedicated ride service application or another application via which a user of the device may submit a request for a vehicle ride by entering a starting point, a destination, or both. The request will be in the form of data, transmitted via data packets, that includes a loading point or PDZ for a loading operation, a loading point or PDZ for an unloading operation, and optionally other information such as identifying information about the passenger, as well as a pick-up time. The operator of the electronic device 101 may be the passenger who is requesting the ride, or someone else who is requesting the ride on behalf of the passenger. Further, in some embodiments the "passenger" need not be a person but could be a package, an animal, or another item for which the operator of the electronic device 101 submits a ride service request. In such situations the ride service request may actually be a delivery service request. For simplicity, except where specifically denoted when this document uses the term "ride service" it should be interpreted to include both passenger and package transportation services, and the term "passenger electronic device" should be interpreted to include devices operated by or on behalf of passengers as well as devices operated by individuals who seek delivery of a package.

Figure 2A:
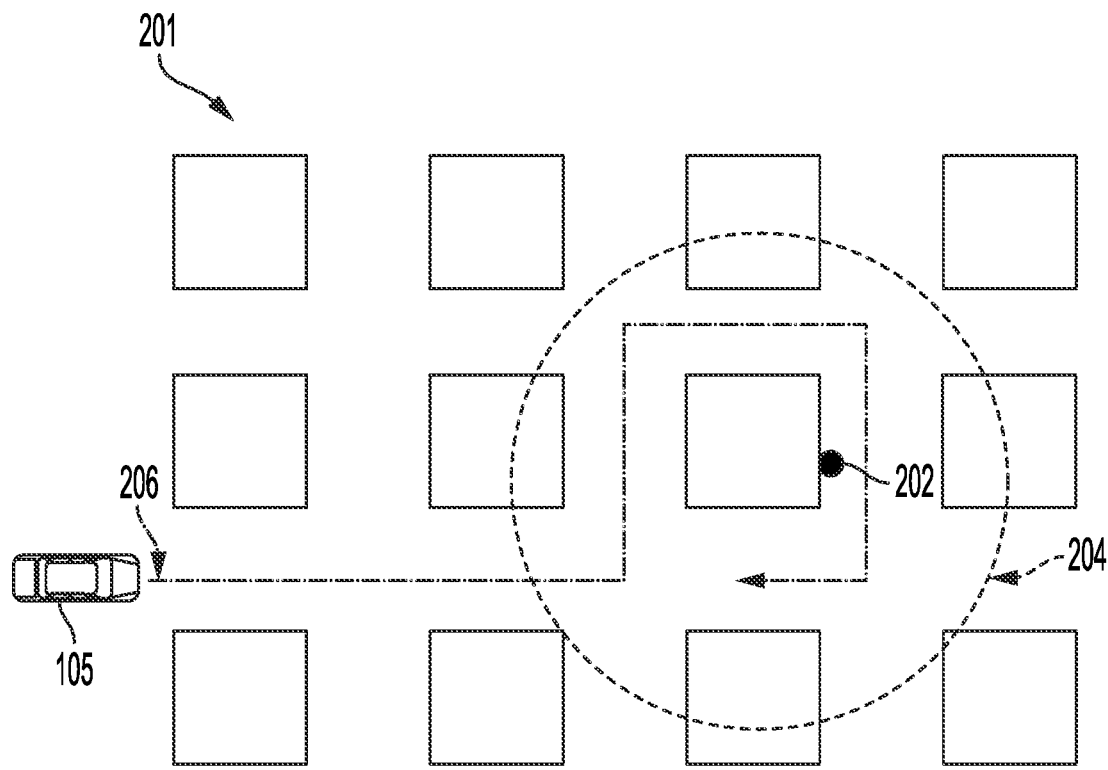
FIGS. 2A and 2B illustrate zones and stopping locations within a mapped area at which a vehicle may stop to pick up or drop off a passenger.
Figure 2B:
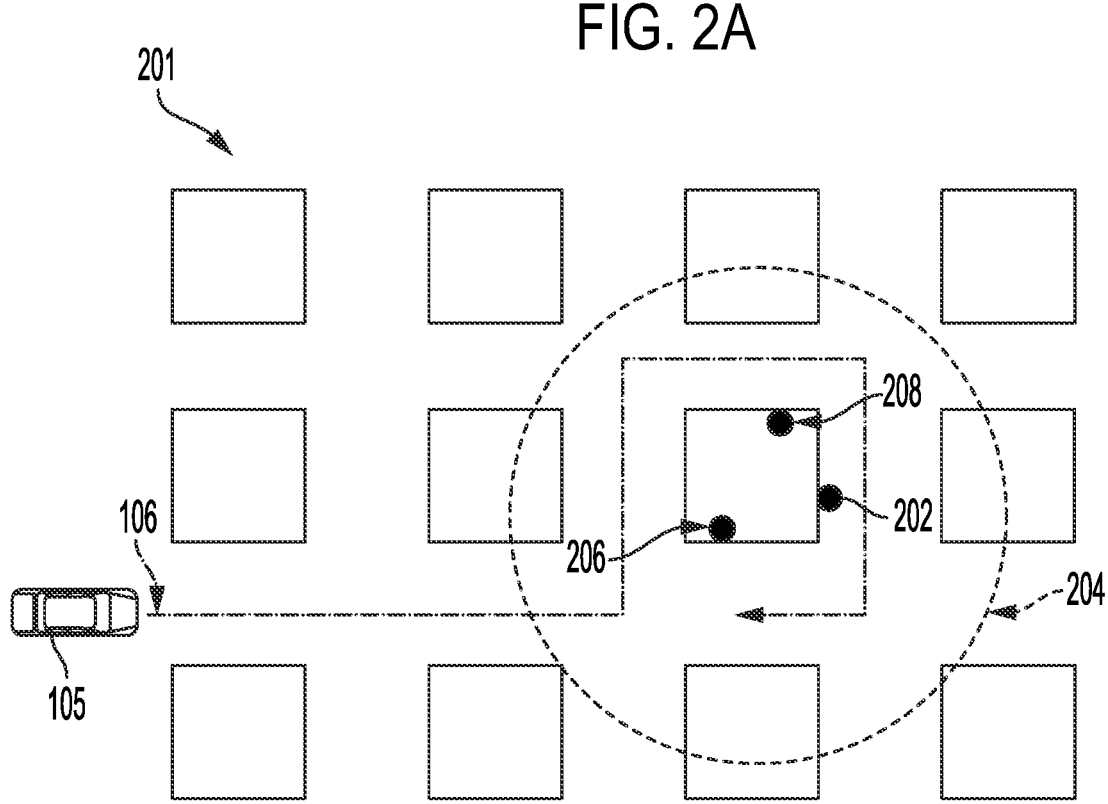

The concepts of a Pickup/Drop-off Zone, Desired Stopping Location, Intermediate Stopping Locations and Final Stopping Location are now illustrated by way of example in FIGS. 2A and 2B, in which the AV 105 has access to a map 201 of an area, which in this example is a grid of several blocks of city streets. The map 201 will typically be stored in a memory onboard the vehicle. The map may be periodically updated by the remote server and/or augmented by information that the AV's perception system detects as the AV 105 moves through the area. The AV 105 receives, via a wireless communication network, a service request to pick up or drop off a passenger at a loading point (DSL 202). The AV 105 then determines a path or route 206 via, although it could also be stored on a mobile electronic device or on an offboard server that is in communication with the AV which the AV 105 may navigate to the DSL 202. Upon determining that the DSL is not within a fixed PDZ of the mapped area, the AV 105 will identify a PDZ 204 that includes the DSL 202. The AV 105 also identifies one or more ISLs 206, 208 that are alternate locations within the PDZ 204 along the route 206 that are either before or after the DSL 202 and at which the AV 205 may pick up or drop off the passenger. Depending on conditions that the AV 105 encounters at the DSL 202, the AV 105 will select either the DSL 202 or one of the ISLs 206 or 208 to be the FSL at which the AV 105 will pick up or drop off the passenger. Processes of determining DSLs, ISLs and PDZs will be described below.

Figure 3:
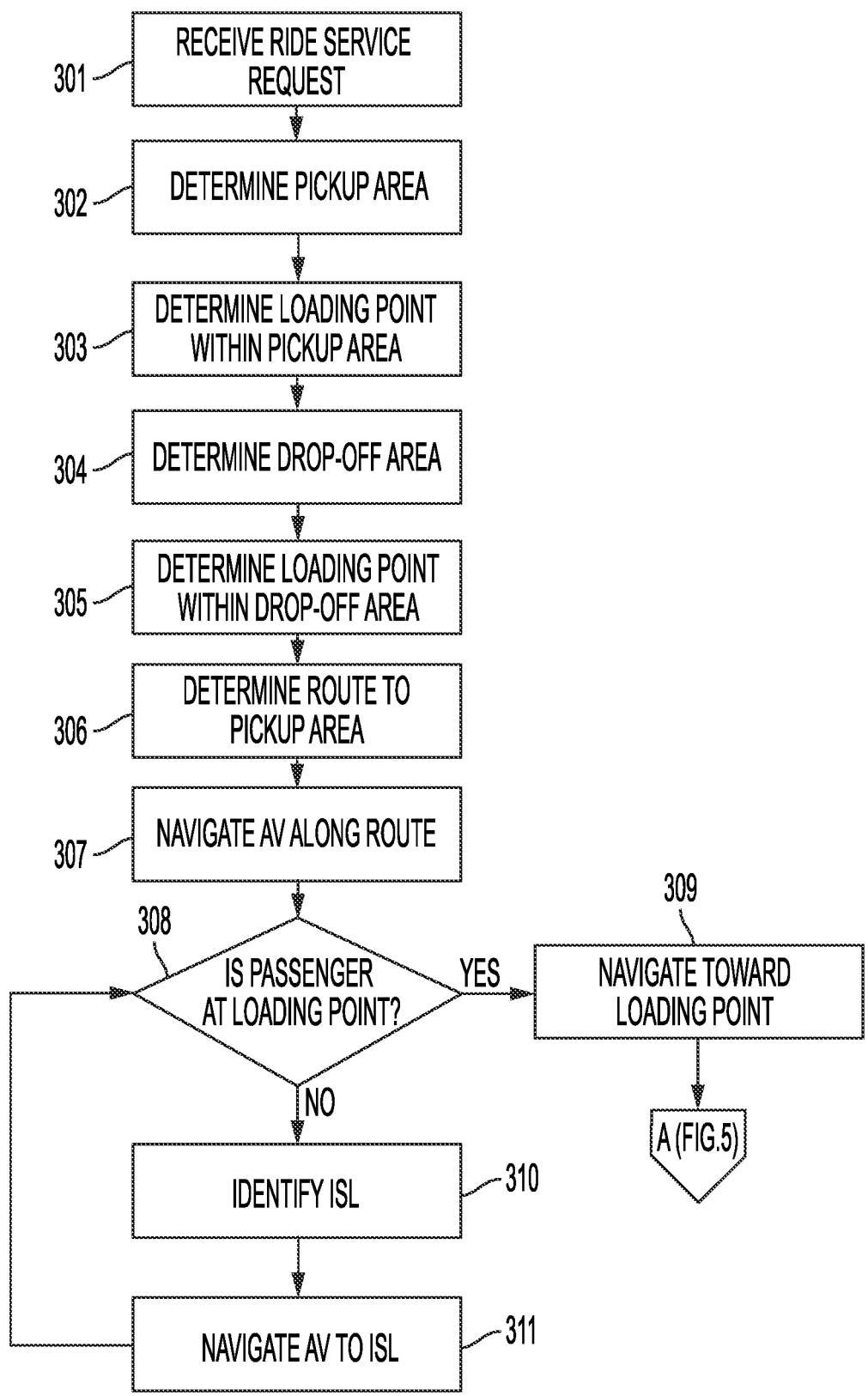
FIG. 3 illustrates a process by which an AV may receive and initially respond to a ride service request.

FIG. 3 illustrates a process by which the AV may respond to a ride service request. At 301 the AV will receive a ride service request that was transmitted to the AV by a ride service application on a passenger electronic device, either directly via a remote server that receives the request, processes it, selects the AV to handle the request, and transmits the request to the AV. The request will be in the form of data that includes a loading point or PDZ for a loading operation, a loading point or PDZ for an unloading operation, and optionally other information such as identifying information about the passenger, as well as a pick-up time.

At 302 the AV will determine a pickup area for a loading operation of the ride service request. The pickup area is a location on the map or a set of geographic coordinates that correlate to the map, in each case corresponding to map location or coordinates received from the passenger electronic device in the ride service request. At 303 the AV will also determine a loading point within the pickup area. The order of steps 302 and 303 may in the order shown or reversed, depending on the implementation. Example methods of determining the pickup area and the loading point include:

Example 1—Ride Service Request Specifies DSL

The ride service request may include a specific location at which the passenger requests a loading operation. Such locations may include, for example, the entrance of a specified building, or a transit stop. If so, then the system may identify the loading point/DSL in its map and define the pickup area as an area around the loading point in which a loading and/or unloading operation is permitted. The pickup area may be, for example, a defined PDZ that is stored in the map data and that includes the loading point. Alternatively, a pickup area may be a predetermined queue location (such as an airport or train station ride sharing queue area) that includes the loading point. Alternatively, the system may dynamically determine the pickup area based on one or more rules, such as those discussed below in the context of FIG. 3, step 310 for ISLs.

Example 2—Ride Service Request Specifies Pickup Area, but not Specific DSL

The ride service request may include a general area within which the passenger requests a loading operation. Such locations may include, for example, a city block that is defined by a pickup street and the closest two cross streets, or a building having multiple entrances. If so, then the system may dynamically determine a loading point/DSL within the pickup area based on one or more rules, such as those discussed below in the context of FIG. 3 at step 310 for ISLs.

Figure 4:
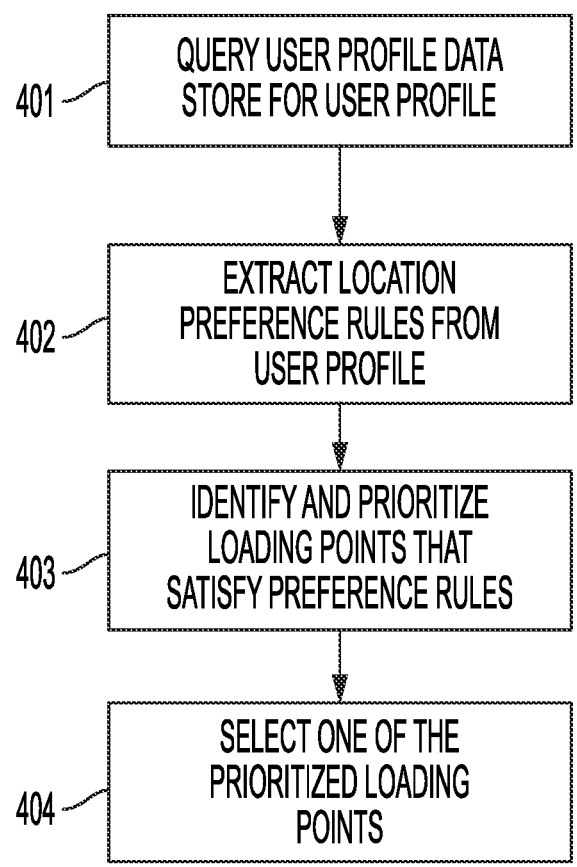
FIG. 4 is flowchart illustrating a process for dynamically determining a loading point for a ride service.

In addition or alternatively, as illustrated in FIG. 4 at 401 to determine the DSL the system may use a user identifier associated with the passenger electronic device to query a user profile data store to identify a stored profile that is associated with the same user identifier. The user profile data store may be part of a remote server such as server 105 of FIG. 1, stored in the AV's onboard memory, or a combination of the two. At 402 the system may extract, from the identified profile, one or more location preference rules for the user. At 403 the system will then analyze the map data and only consider a location to qualify to be a loading point if it satisfies at least a threshold number of the user's location preference rules. In addition, the system may rank, score and/or otherwise prioritize candidate loading points depending on how many of the location preference rules they satisfy, or by assigning each location a score that in which some location preference rules are given higher weights than others. For example, the rules may require that a DSL be positioned in a lane segment or group of lane segments that are located in front of an entry door of a building having a location that corresponds to a location of the electronic device, or the rules may assign a relatively higher weighted value to such lane segments in a scoring algorithm. Alternatively, the rules may require that any DSL lane include a segment or group of lane segments that are midway between two cross streets, or that are as close as possible to the cross street that is next in the direction of traffic while remaining at least six meters (or another suitable threshold distance) away from that cross street, or that are no longer than a specified walking distance from a designated point. The rules also may assign relatively higher weighted values to such lane segments in a scoring algorithm. In addition, if the user profile includes a stored DSL from a previous ride service, the rules may require that the system give first priority to and use the stored DSL as the loading point for the current ride sharing request.

Optionally, the system may require that the loading point meet both user preference criteria and one or more rules such as those discussed below.

At 304 the system will determine a drop-off area for the ride service request, and at 305 the system will determine a loading point within the drop-off area. Algorithms for steps 304 and 305 can be the same as those discussed above for steps 302 and 303, and the order of steps 304 and 305 may be reversed in some embodiments. In addition, any or all of steps 302-304 (along with other steps discussed below) may be performed by the AV's onboard computing system, by that of a remote server that transmits the determinations to the AV, or by a combination of the onboard and remote processing systems.

At 305 a motion planning system of the AV will determine a route from its current location to the pickup area. When doing this, the AV may map the route to the loading point, or to a point of entry into the pickup area, or to any other point of the pickup area. To map the AV's route, the system may use any trajectory planning methods are now or hereafter known to those of skill in the art, including but not limited to those discussed below in the context of FIG. 6. At 306 the AV's control system will cause the AV to navigate along the planned route toward the pickup area, using processes such as those also discussed below in the context of FIG. 6.

Before the AV reaches the pickup area, at 308 the AV's onboard system and/or remote server will determine whether either of the systems received a departure confirmation from the passenger electronic device. A departure confirmation is a communication indicating that the passenger (or cargo) is present at the loading point. The communication may be an active message generated by the passenger electronic device in response to a user input or based on an automated message generation process that sends the message when it detects that the device is at or within a threshold distance from the loading point. In addition or alternatively, the communication may be a set of coordinates (in geographic coordinates such as in GPS data, or as coordinates in the map data) of the passenger electronic device, and the system may compare those coordinates with that of the loading point, in which case the system may determine that the passenger is present at the loading point only if the passenger device's coordinates are no more than a threshold distance from that of the loading point.

If the passenger is present at the loading point (308:YES), then at 309 the AV's motion planning and control systems will continue to cause the AV to move along the route to the DSL. When doing this, the systems may cause the AV to make one or more other decisions, which will be discussed below in the context of FIG. 4.

If the passenger is not present at the loading point (308:NO), at 310 the system will identify one or more ISLs that are either (a) along the route before the pickup area, or (b) within the pickup area. At 311 the AV's motion planning system will plan a trajectory to one of the ISLs, and the control system will cause the AV to move along the trajectory to the ISL. The AV may then hold its position at the ISL until: (i) it receives notification that the passenger is at the loading point (at 308); (ii) it receives a command to cancel the ride service request and move to another location; or (iii) a time-out period elapses, after which time the ride service request may be considered to be canceled or suspended.

Some ISLs may be defined in the map data that is available to the AV. Alternatively, to identify ISLs at step 310, the system may scan the map data representing one or more lane segments along the route between the AV and the loading point that satisfy a set of rules of being a permissible stopping location. The rules may include those adapted from traffic control regulations, from safety-related parameters, and/or from dynamic conditions that the AV detects. The system may determine candidate ISLs as those that meet certain static permissible stopping location criteria, such as:
- in-lane or curbside parking must be permitted by law in the lane segments;
- the speed limit associated with the lane segment must not be more than a specified threshold level (such as 30 miles per hour or 50 kilometers per hour);
- the lane segment must not be located less than a specified distance (such as 6 meters) from an intersection;
- the lane segment must not include a crosswalk;
- the lane segment must be adjacent to a curb of the street of which it is a part;
- the lane segment must not be adjacent to an exit ramp of a parking garage; or
- the lane segment must not be in an area that is designated in map data as a no-stop zone.

To qualify as an ISL at 310, a lane segment may be required to meet any or all of the static permissible stopping location criteria listed above, and/or other criteria.

At 311 the system may then select one of the ISLs and cause the AV to move into and stop at the selected ISL. The selected ISL may be the first ISL that the vehicle will encounter along the route, the last ISL that exists along the route before the loading point, or some other ISL. In addition, before stopping at any ISL, the AV's perception system may scan various actors in and around the ISL to confirm that the ISL is presently a permissible stopping location. Methods of doing this for a loading point will be discussed below in the context of FIG. 5, and such methods also may be used in this step. If the AV determines that the selected ISL is not presently a permissible stopping location, it may cause the vehicle's control system to select a different ISL on the route and move the AV to the different ISL. If no ISLs along the route are permissible stopping location, the AV may identify an ISL that is not along the route but instead which is beyond the loading point. The AV may then move to that ISL and hold. When the passenger is at the loading point, the AV may then navigate back into to the route at an entry point that is before the loading point.

As the AV moves toward the loading point (step 309 of FIG. 3), when it reaches a range at which it can perceive the loading point it will analyze data collected by the AV's perception system to dynamically determine whether the loading point is currently a permissible stopping location. Methods of identifying, classifying, and predicting actions of actors and other objects in a zone (such as an area around a loading point) will be discussed below in the context of FIG. 6. The system may determine whether the loading point is currently a permissible stopping location by one or more rules to the perception data, and determining that the loading point is not a permissible stopping location if it does not satisfy each of the rules, or at least certain specified rules, or if the location does not meet certain criteria or combinations of criteria.

Figure 5:
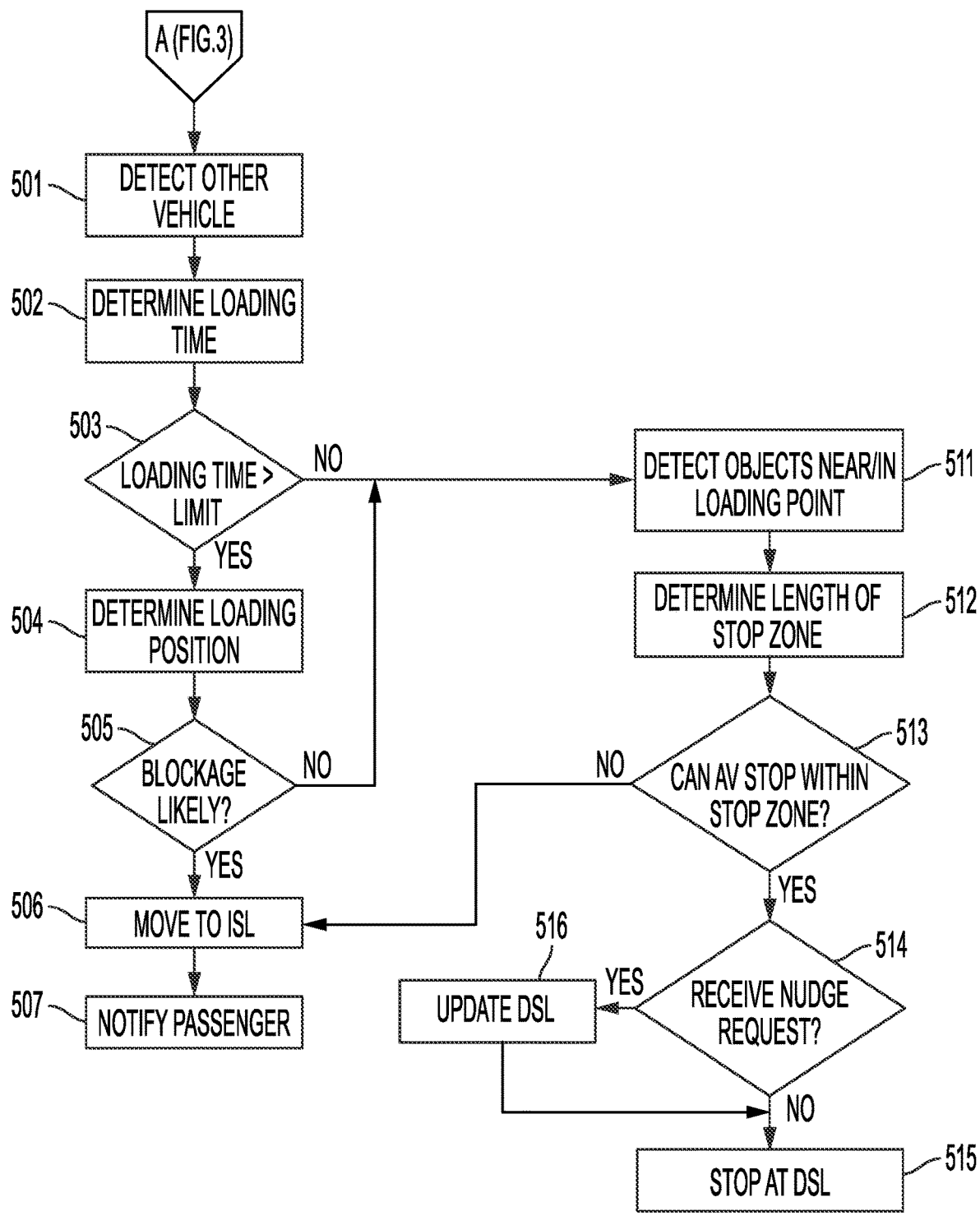
FIG. 5 illustrates a process for determining a final stopping location in response to a ride service request.

For examples, with reference to FIG. 5, at 501 the AV may monitor progress of another vehicle that is behind the AV in its lane. The AV may then determine whether, if the AV stops at the loading point, the AV will block progress of the other vehicle that is following the AV. To do this, at 502 the system may determine a length of time at which the AV is expected to stop during the loading operation (either by calculation or by a loading time as stored in memory). At 504 the system may identify the loading position (i.e., the lane in which the loading point is located). If both (a) the loading time will exceed a limit that will cause the detected other vehicle to non-suddenly stop or that will require the other vehicle to stop more than a threshold period of time, or the loading position will cause the other vehicle to violate one or more permissible stopping criteria (503:YES), and (b) the loading position will block the AV's current lane of travel (505: YES), then at 506 the AV will move to an ISL instead of the DSL for the loading operation, and at 507 it will generate and transmit a notification to the passenger electronic device indicating that the AV will perform the loading operation at an alternate location (the ISL) instead of the DSL.

The determination in step 503 of whether the loading time will exceed a limit within which the detected other vehicle can non-suddenly stop, or that will require the other vehicle to stop more than a threshold period of time, or that will require the other vehicle to violate one or more permissible stopping criteria, may be performed using any suitable algorithm. For example, if the other vehicle is following the AV at a speed S and distance D within which it could not stop during an expected time T for the loading operation without hitting the AV (i.e., if D is less than or equal to $S*T$ plus a buffer distance), or if the loading operation would require the other vehicle to decelerate by more than a threshold value, it may determine that the other vehicle will not be able to non-suddenly stop. The system also may consider various factors to consider the loading time limit. For example, the system may store a default loading time limit, or it may select a limit from memory based on one or more characteristics of the loading point (such as type of road, or category of building located at the stopping location). In addition, the system may dynamically adjust the time limit based on characteristics of the loading point that it detects as it approaches the location. For example, if at least a threshold number of other actors are traveling near the loading location at a speed of at least S, then the system may reduce the default loading time by a particular amount.

If the loading operation will not obstruct another vehicle (i.e., if the determination of either step 503 or step 505 is NO), then at 511 the system may then examine perceived objects in and around the loading point to determine whether the AV can suddenly reach the loading point in compliance with permissible stopping criteria. At 512 the AV's perception system may determine and measure space around and between the objects to measure or estimate the length of a stop zone that includes the loading point and that is free from obstruction by other objects. At 513 the system may then determine whether the AV can stop within the stop zone. The system may do this by confirming that the stop zone length at least equals the length of the AV plus a defined buffer. If the stop zone is too short to enable the vehicle to safely and non-suddenly stop (i.e., if it would require the AV to decelerate more than a threshold value), or if the stop zone is too short to accommodate the vehicle at all, or if the stop zone violates one of the other permissible stopping criteria described above (513:NO), the system may select an ISL and move the navigate the AV to the ISL (step 506) and also notify the passenger (step 507). If the vehicle can non-suddenly stop in the stop zone while complying with the criteria, then at 515 the AV may move into the stop zone and stop at the loading point. The system may determine these values from a look-up table that correlates vehicle speeds to save stop zone lengths and identifying a length for the AV's current speed, or by an algorithm such as a cost function that determines a cost for one or more characteristics of the stop zone such as lane width, specific road geometry (are there indentations, is it a driveway, etc.) or other detected characteristics and sums or otherwise determines a function of these costs.

Optionally, before or after reaching the DSL, at 514 the vehicle may receive a nudge request from the passenger electronic device. A nudge request is an indication that the AV's chosen final stopping location is inconvenient for the passenger. For example, this may happen if the AV stops in front of a large puddle, or in front of an object that would interfere with opening the vehicle's door. If the AV receives a nudge request, it may identify a distance (such as half of the length of the vehicle) that it should move forward to an alternate DSL, analyze perception data to ensure that no object is ahead of the AV that would prevent such movement, and if the perception distance indicates that the path is clear update the DSL to the forward location at 516 and move the AV to the updated DSL at 515. A nudge request may be submitted and acted upon after the AV selects the DSL as its final stopping location as shown in FIG. 5, as well as after the AV selects an ISL as the final stopping location.

The methods described in FIG. 5 for determining whether an AV can stop at a DSL can also be used to determine whether an AV can stop at an ISL. In addition, the methods described in FIG. 5 can be used for DSLs in both loading operations and unloading operations. The process of FIG. 3 would also apply to drop-off operations except that step 307 (and its negative options) would not apply because the passenger would already be onboard the vehicle.

Figure 6:
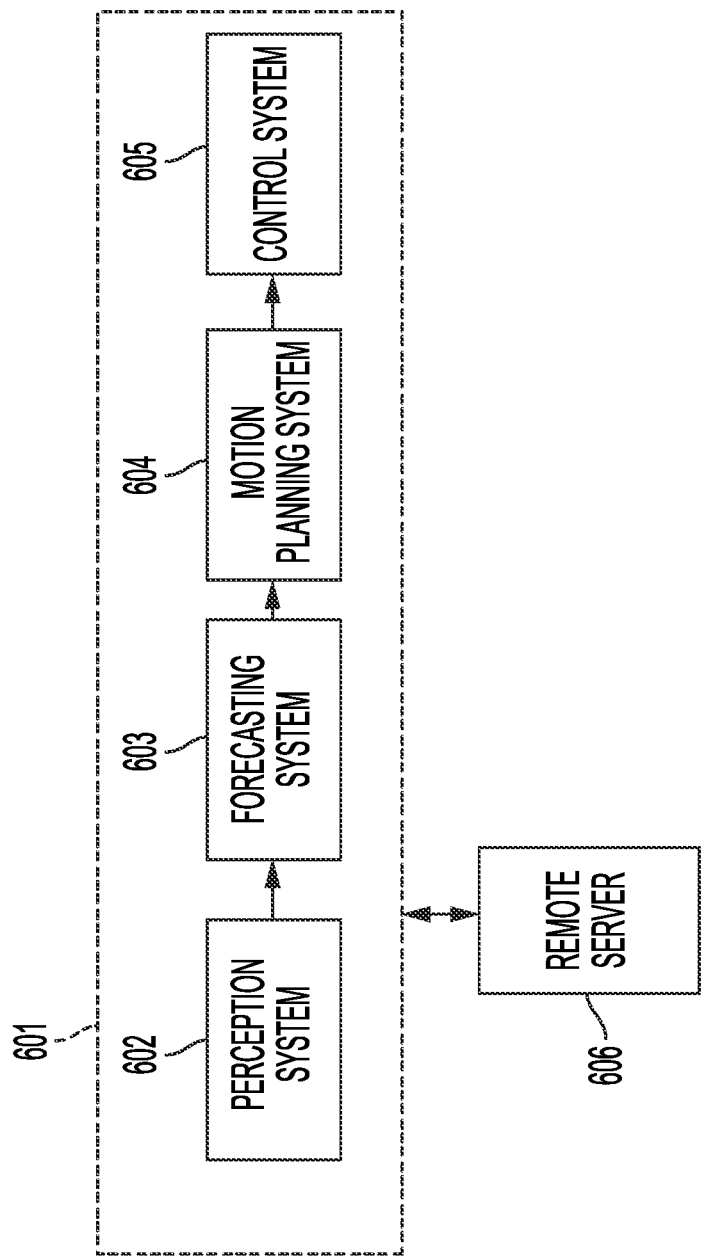
FIG. 6 is a block diagram that shows a high-level overview of certain AV sub systems.

FIG. 6 shows a high-level overview of AV subsystems that may be relevant to the discussion above. Specific components within such systems will be described in the discussion of FIG. 7 later in this document. Certain components of the subsystems may be embodied in processor hardware and computer-readable programming instructions that are part of the AV's on-board computing system 601. The subsystems may include a perception system 602 that includes sensors that capture information about moving actors and other objects that exist in the vehicle's immediate surroundings. Example sensors include cameras, LiDAR sensors and radar sensors. The data captured by such sensors (such as digital image, LiDAR point cloud data, or radar data) is known as perception data.

The perception system may include one or more processors, and computer-readable memory with programming instructions and/or trained artificial intelligence models that, during a run of the AV, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

The vehicle's perception system 602 may deliver perception data to the vehicle's forecasting system 603. The forecasting system (which also may be referred to as a prediction system) will include processors and computer-readable programming instructions that are configured to process data received from the perception system and forecast actions of other actors that the perception system detects.

The vehicle's perception system, as well as the vehicle's forecasting system, will deliver data and information to the vehicle's motion planning system 604 and motion control system 605 so that the receiving systems may assess such data and initiate any number of reactive motions to such data. The motion planning system 604 and control system 605 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in IEEE Transactions on Intelligent Transportation Systems, vol. 17, no. 4 (April 2016).

During deployment of the AV, the AV receives perception data from one or more sensors of the AV's perception system. The perception data may include data representative of one or more objects in the environment. The perception system will process the data to identify objects and assign categorical labels and unique identifiers to each object detected in a scene.

The vehicle's on-board computing system 601 will be in communication with a remote server 606. The remote server 606 is an external electronic device that is in communication with the AV's on-board computing system 601, either via a wireless connection while the vehicle is making a run, or via a wired or wireless connection while the vehicle is parked at a docking facility or service facility. The remote server 606 may receive data that the AV collected during its run, such as perception data and operational data. The remote server 606 also may transfer data to the AV such as software updates, high definition (HD) map updates, machine learning model updates and other information.

Figure 7:
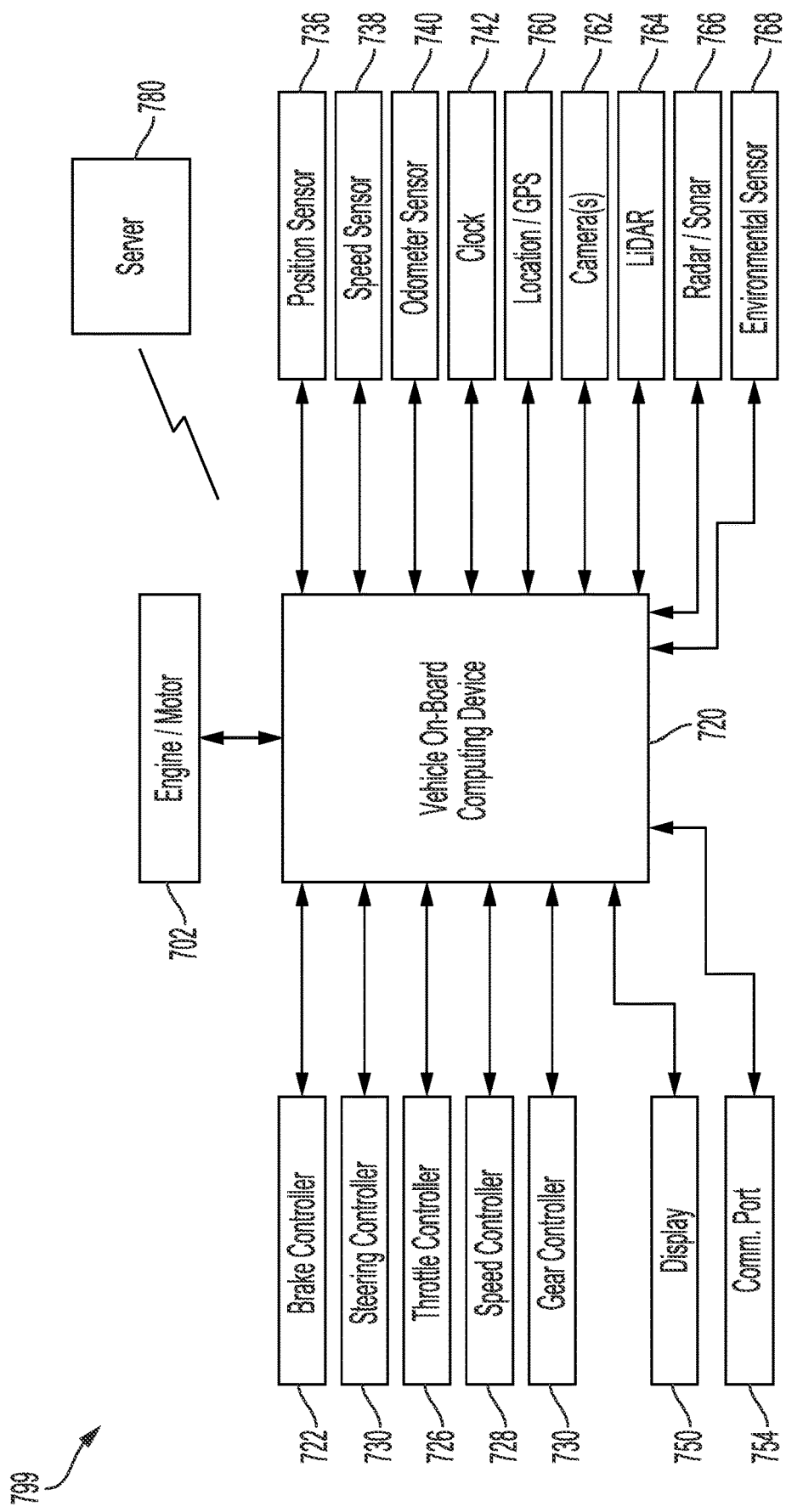
FIG. 7 illustrates example systems and components of an autonomous vehicle.

FIG. 7 illustrates an example system architecture 799 for a vehicle, such as an AV. The vehicle includes an engine or motor 702 and various sensors for measuring various parameters of the vehicle and/or its environment. Operational parameter sensors that are common to both types of vehicles include, for example: a position sensor 736 such as an accelerometer, gyroscope and/or inertial measurement unit; a speed sensor 738; and an odometer sensor 740. The vehicle also may have a clock 742 that the system uses to determine vehicle time during operation. The clock 742 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 760 such as a global positioning system (GPS) device; object detection sensors such as one or more cameras 762; a LiDAR sensor system 764; and/or a radar and or and/or a sonar system 766. The sensors also may include environmental sensors 768 such as a precipitation sensor and/or ambient temperature sensor. The object detection sensors may enable the vehicle to detect moving actors and stationary objects that are within a given distance range of the vehicle 799 in any direction, while the environmental sensors collect data about environmental conditions within the vehicle's area of travel. The system will also include one or more cameras 762 for capturing images of the environment. Any or all of these sensors will capture sensor data that will enable one or more processors of the vehicle's on-board computing device 720 and/or external devices to execute programming instructions that enable the computing system to classify objects in the perception data, and all such sensors, processors and instructions may be considered to be the vehicle's perception system. The vehicle also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle may encounter or affect in its environment.

During a run of the vehicle, information is communicated from the sensors to an on-board computing device 720. The on-board computing device 720 analyzes the data captured by the perception system sensors and, acting as a motion planning system, executes instructions to determine a trajectory for the vehicle. The trajectory includes pose and time parameters, and the vehicle's on-board computing device will control operations of various vehicle components to move the vehicle along the trajectory. For example, the on-board computing device 720 may control braking via a brake controller 722; direction via a steering controller 724; speed and acceleration via a throttle controller 726 (in a gas-powered vehicle) or a motor speed controller 728 (such as a current level controller in an electric vehicle); a differential gear controller 730 (in vehicles with transmissions); and/or other controllers.

Geographic location information may be communicated from the location sensor 760 to the on-board computing device 720, which may then access a map of the environment that corresponds to the location information to determine known fixed features of the environment such as streets, buildings, stop signs and/or stop/go signals. Captured images from the cameras 762 and/or object detection information captured from sensors such as a LiDAR system 764 is communicated from those sensors) to the on-board computing device 720. The object detection information and/or captured images may be processed by the on-board computing device 720 to detect objects in proximity to the vehicle 700. In addition or alternatively, the AV may transmit any of the data to an external server 780 for processing. Any known or to be known technique for performing object detection based on sensor data and/or captured images can be used in the embodiments disclosed in this document.

In addition, the AV may include an onboard display device 750 that may generate and output interface on which sensor data, vehicle status information, or outputs generated by the processes described in this document are displayed to an occupant of the vehicle. The display device may include, or a separate device may be, an audio speaker that presents such information in audio format.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decisionmaking and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network.

Figure 8:
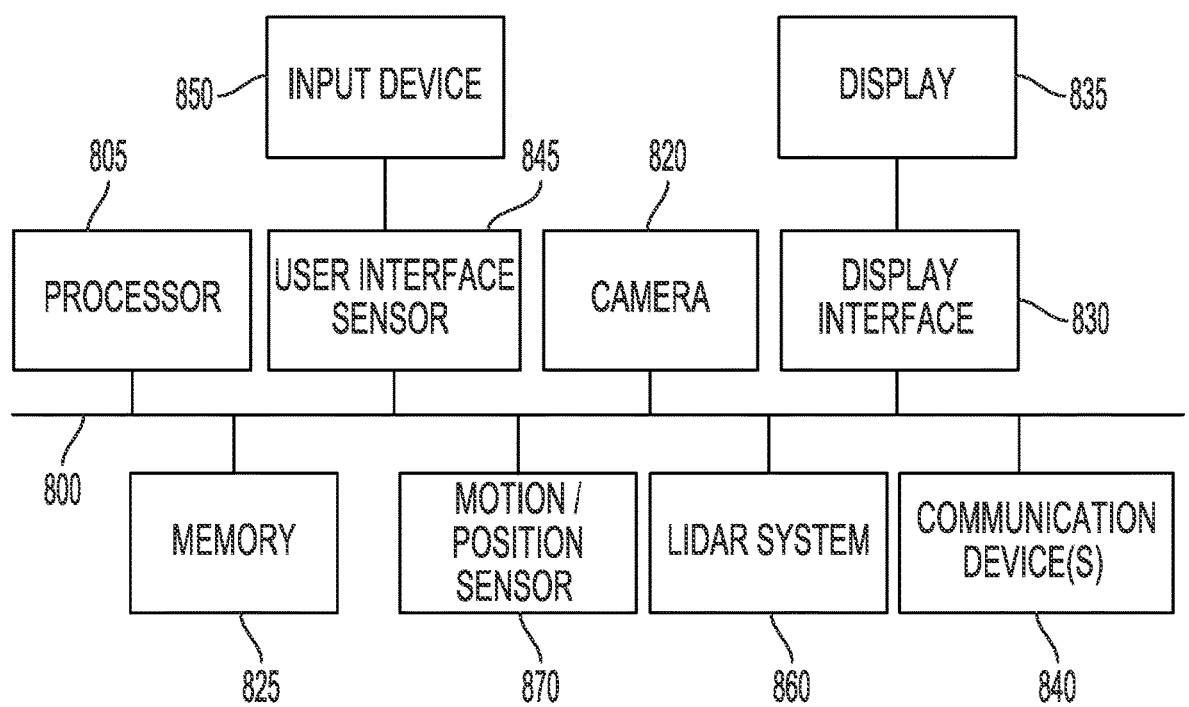
FIG. 8 is a block diagram that illustrates various elements of one or more electronic subsystems of an AV and/or external electronic device.

FIG. 8 depicts an example of internal hardware that may be included in any of the electronic components of the system, such as internal processing systems of the AV, external monitoring and reporting systems, or remote servers. An electrical bus 800 serves as an information highway interconnecting the other illustrated components of the hardware. Processor 805 is a central processing device of the system, configured to perform calculations and logic operations required to execute programming instructions that are stored on one or more memory devices 825. Various embodiments of the invention may include a computer-readable medium containing programming instructions that are configured to cause one or more processors to perform the functions described in the context of the previous figures.

An optional display interface 830 may permit information from the bus 800 to be displayed on a display device 835 in visual, graphic or alphanumeric format, such on an in-dashboard display system of the vehicle. An audio interface and audio output (such as a speaker) also may be provided. Communication with external devices may occur using various communication devices 840 such as a wireless antenna, a radio frequency identification (RFID) tag and/or short-range or near-field communication transceiver, each of which may optionally communicatively connect with other components of the device via one or more communication system. The communication device(s) 840 may be configured to be communicatively connected to a communications network, such as the Internet, a local area network or a cellular telephone data network.

The hardware may also include a user interface sensor 845 that allows for receipt of data from input devices 850 such as a keyboard or keypad, a joystick, a touchscreen, a touch pad, a remote control, a pointing device and/or microphone. Digital image frames also may be received from a camera 820 that can capture video and/or still images. The system also may receive data from a motion and/or position sensor 870 such as an accelerometer, gyroscope or inertial measurement unit. The system also may receive data from a LiDAR system 860 such as that described earlier in this document.

The features and functions disclosed above, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

The term "ride" refers to the act of operating a vehicle to move from a point of origin to a destination in the real world, while carrying a passenger or cargo that embarks or is loaded onto the vehicle at the point of origin, and which disembarks or is unloaded from the vehicle at the destination.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

An "electronic device", "server" or "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. A computer program product is a memory device with programming instructions stored on it. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

The invention claimed is:

1. A method of determining a stopping location for a vehicle before picking up a passenger, the method comprising:

by one or more processors, at least one of which is a component of an autonomous vehicle (AV):

receiving a ride service request that has been transmitted from a ride service application on a passenger electronic device;

determining a pickup area for the ride service request, along with a loading point that is within a pickup area;

determining a route from a starting location of the AV to the pickup area;

navigating the AV along the route toward the pickup area;

before the AV reaches the pickup area, determining whether the one or more processors have received a departure confirmation from the passenger electronic device, wherein the departure confirmation comprises data confirming that coordinates of the passenger electronic device correspond to the loading point; and if the one or more processors have received the departure confirmation, causing the AV to navigate into the pickup area and stop at the loading point, otherwise causing the AV to either (a) navigate to an intermediate stopping location before reaching the pickup area or (b) pass through the pickup area.

2. The method of claim 1, wherein determining the loading point comprises:

determining a passenger identifier that is associated with the passenger electronic device;

accessing a passenger profile server and querying the passenger profile server for a passenger profile that corresponds to the passenger identifier;

accessing the passenger profile to extract one or more loading point location rules from the passenger profile; and using the loading point location rules to select the loading point from a set of candidate loading points.

3. The method of claim 2, wherein the loading point location rules comprise one or more rules to prioritize one or more of the following characteristics to determine the loading point:

a lane segment that is in front of an entry of a building having a location that corresponds to a location of the passenger electronic device;

a lane segment that is midway between two cross streets; or a lane segment that is as close as possible to the cross street that is next in the direction of traffic while remaining a threshold distance away from that cross street.

4. The method of claim 1 further comprising, by the one or more processors, determining the intermediate stopping location as a location that:
   is along the route between a current location of the AV and the loading point; and
   satisfies each of a plurality of permissible stopping location criteria.

5. The method of claim 1 further comprising, by the one or more processors after the one or more processors have received the departure confirmation:
   before the AV reaches the loading point, processing data received from a perception system of the AV to determine whether the AV can stop and perform a loading operation at the loading point without obstructing another vehicle that is following the AV; and
   only stopping the AV at the loading point to perform the loading operation if the loading operation will not obstruct the other vehicle, otherwise navigating the AV to an intermediate stopping location and notifying the passenger electronic device that the loading operation will be performed at the intermediate stopping location.

6. The method of claim 5, wherein determining whether the AV can stop and perform a loading operation at the loading point without obstructing another vehicle that is following the AV comprises:
   determining whether the loading point is in a location that will require the AV to at least partially block a lane in the other vehicle that is following the AV is currently traveling; and
   determining that the AV will obstruct the other vehicle if:
     the loading point is in a location that will require the AV to at least partially block the lane, and
     the loading operation will have a duration that exceeds a time before which the other vehicle can non-suddenly stop.

7. The method of claim 1 further comprising, by the one or more processors after the one or more processors have received the departure confirmation and before the AV reaches the loading point, processing data received from a perception system of the AV to:
   identify one or more objects located proximate to the loading point;
   measure a length of a stop zone that includes the loading point and that is free from obstruction;
   use a current speed of the AV and the measured length of the stop zone to determine whether the AV can non-suddenly stop within the stop zone in compliance with the permissible stopping criteria; and
   only stop at the loading point to perform the loading operation if the AV can non-suddenly stop within the stop zone in compliance with the permissible stopping criteria, otherwise navigate the AV to an intermediate stopping location and notifying the passenger electronic device that the loading operation will be performed at the intermediate stopping location.

8. The method of claim 1 further comprising, by the one or more processors after the AV has stopped in the pickup area:
   receiving a nudge request from the passenger electronic device;
   processing data received by a perception system of the AV to determine whether any objects would obstruct the AV when the AV would move to a position that is ahead of the loading point by a specified distance; and
   in response to determining that no objects would obstruct the AV when the AV would move to the position, update the loading point to move forward by the specified distance and move the AV to the updated loading point.

9. The method of claim 1 further comprising, by the one or more processors when the one or more processors have not received the departure confirmation, determining the intermediate stopping location by:
   selecting a road segment that is a nearest useable road segment to the pickup location;
   identifying, from one or more permissible stopping points along the road segment, the permissible stopping point that is closest to the pickup location; and
   using the permissible stopping point that is closest to the pickup location as the intermediate stopping location.

10. The method of claim 1, wherein the data confirming that coordinates of the passenger electronic device correspond to the loading point comprise data confirming that the passenger electronic device is at or within a threshold distance from the loading point.

11. A ride service system, comprising:
   an autonomous vehicle (AV) comprising a perception system, a motion planning system and a motion control system;
   a processor; and
   a memory containing programming instructions that are configured to cause the processor to determine a stopping location for the AV before picking up a passenger by:
     receiving a ride service request that has been transmitted from a ride service application on a passenger electronic device,
     determining a pickup area for the ride service request, along with a loading point that is within a pickup area,
     causing the motion planning system to determine a route from a starting location of the AV to the pickup area,
     causing the motion control system to move the AV along the route toward the pickup area,
     before the AV reaches the pickup area, determining whether the processor has received a departure confirmation from the passenger electronic device, wherein the departure confirmation comprises data confirming that coordinates of the passenger electronic device correspond to the loading point, and
     if the one or more processors have received the departure confirmation, causing the motion control system to move the AV into the pickup area and stop at the loading point, otherwise causing the motion control system to either (a) move the AV to an intermediate stopping location before reaching the pickup area or to (b) cause the AV to pass through the pickup area.

12. The ride service system of claim 11, wherein the instructions to determine the loading point comprise instructions to:
   determine a passenger identifier that is associated with the passenger electronic device;
   access a passenger profile server and query the passenger profile server to return a passenger profile that corresponds to the passenger identifier;
   access the returned passenger profile to extract one or more loading point location rules from the returned passenger profile; and
   use the loading point location rules to select the loading point from a set of candidate loading points.

13. The ride service system of claim 12, wherein the loading point location rules comprise one or more rules to prioritize one or more of the following characteristics to determine the loading point:
- a lane segment that is in front of an entry of a building having a location that corresponds to a location of the passenger electronic device;
- a lane segment that is midway between two cross streets; or
- a lane segment that is as close as possible to the cross street that is next in the direction of traffic while remaining a threshold distance away from that cross street.

14. The ride service system of claim 11, further comprising additional programming instructions that are configured to cause the processor to determine the intermediate stopping location as a location that:
- is along the route between a current location of the AV and the loading point; and
- satisfies each of a plurality of permissible stopping location criteria.

15. The ride service system of claim 11, further comprising additional programming instructions that are configured to cause the processor to, upon receipt of the departure confirmation:
- before the AV reaches the loading point, process data received from a perception system of the AV to determine whether the AV can stop and perform a loading operation at the loading point without obstructing another vehicle that is following the AV; and
- only stop the AV at the loading point to perform the loading operation if the loading operation will not obstruct the other vehicle, otherwise cause the AV to navigate to an intermediate stopping location and notify the passenger electronic device that the loading operation will be performed at the intermediate stopping location.

16. The ride service system of claim 15, wherein the instructions to determine whether the AV can stop and perform a loading operation at the loading point without obstructing another vehicle that is following the AV comprise instructions to:
- determine whether the loading point is in a location that will require the AV to at least partially block a lane in the other vehicle that is following the AV is currently traveling; and
- determine that the AV will obstruct the other vehicle if:
  - the loading point is in a location that will require the AV to at least partially block the lane, and
  - the loading operation will have a duration that exceeds a time before which the other vehicle can non-suddenly stop.

17. The ride service system of claim 11, further comprising additional programming instructions that are configured to cause the processor to, after receiving the departure confirmation and before the AV reaches the loading point, processing data received from the perception system of the AV to:
- identify one or more objects located proximate to the loading point;
- measure a length of a stop zone that includes the loading point and that is free from obstruction;
- use a current speed of the AV and the measured length of the stop zone to determine whether the AV can non-suddenly stop within the stop zone while complying with permissible stopping criteria; and
- only stop at the loading point to perform the loading operation if the AV can non-suddenly stop within the stop zone while complying with the permissible stopping criteria, otherwise navigate the AV to an intermediate stopping location and notifying the passenger electronic device that the loading operation will be performed at the intermediate stopping location.

18. The ride service system of claim 11 further comprising additional programming instructions that are configured to cause the processor to, after the AV has stopped in the pickup area and in response to receiving a nudge request from the passenger electronic device:
- process data received by the perception system of the AV to determine whether any objects would obstruct the AV when the AV would move to a position that is ahead of the loading point by a specified distance; and
- in response to determining that no objects would obstruct the AV when the AV would move to the position, update the loading point to move forward by the specified distance and move the AV to the updated loading point.

19. The ride service system of claim 11, further comprising additional programming instructions that are configured to cause the one or more processors to, in response to not receiving the departure confirmation, determine the intermediate stopping location by:
- selecting a road segment that is a nearest useable road segment to the pickup location;
- identifying, from one or more permissible stopping points along the road segment, the permissible stopping point that is closest to the pickup location; and
- using the permissible stopping point that is closest to the pickup location as the intermediate stopping location.

20. The ride service system of claim 11, wherein the data confirming that coordinates of the passenger electronic device correspond to the loading point comprise data confirming that the passenger electronic device is at or within a threshold distance from the loading point.

21. A method of determining a stopping location for a vehicle before picking up a passenger, the method comprising:
- by one or more processors, at least one of which is a component of an autonomous vehicle (AV):
  - receiving a ride service request that has been transmitted from a ride service application on a passenger electronic device;
  - determining a pickup area for the ride service request, along with a loading point that is within a pickup area;
  - determining a route from a starting location of the AV to the pickup area;
  - determining an intermediate stopping location as a location that (a) is along the route between a current location of the AV and the loading point, and (b) satisfies each of a plurality of permissible stopping location criteria;
  - navigating the AV along the route toward the pickup area;
  - before the AV reaches the pickup area, determining whether the one or more processors have received a departure confirmation from the passenger electronic device, wherein the departure confirmation comprises data confirming that coordinates of the passenger electronic device correspond to the loading point; and in response to determining that the system has received the departure confirmation:
  causing the AV to navigate toward the pickup area,
  identifying one or more objects located proximate to the loading point,
  measuring a length of a stop zone that includes the loading point and that is free from obstruction,
  using a current speed of the AV and the measured length of the stop zone to determine whether the AV can non-suddenly stop within the stop zone while satisfying each of the plurality of permissible stopping location criteria, and
  stopping at the loading point to perform the loading operation if the system determines that the AV can non-suddenly stop within the stop zone while satisfying each of the plurality of permissible stopping location criteria, otherwise navigating the AV to the intermediate stopping location and notifying the passenger electronic device that the loading operation will be performed at the intermediate stopping location.

22. The method of claim 21 further comprising, by the one or more processors after determining that the system has received the departure confirmation:
  before the AV reaches the loading point, processing data received from a perception system of the AV to determine whether the AV can stop and perform a loading operation at the loading point without obstructing another vehicle that is following the AV; and
  only stopping the AV at the loading point to perform the loading operation if the loading operation will not obstruct the another vehicle, otherwise navigating the AV to the intermediate stopping location and notifying the passenger electronic device that the loading operation will be performed at the intermediate stopping location.

* * * * *